UNITED STATES PATENT OFFICE.

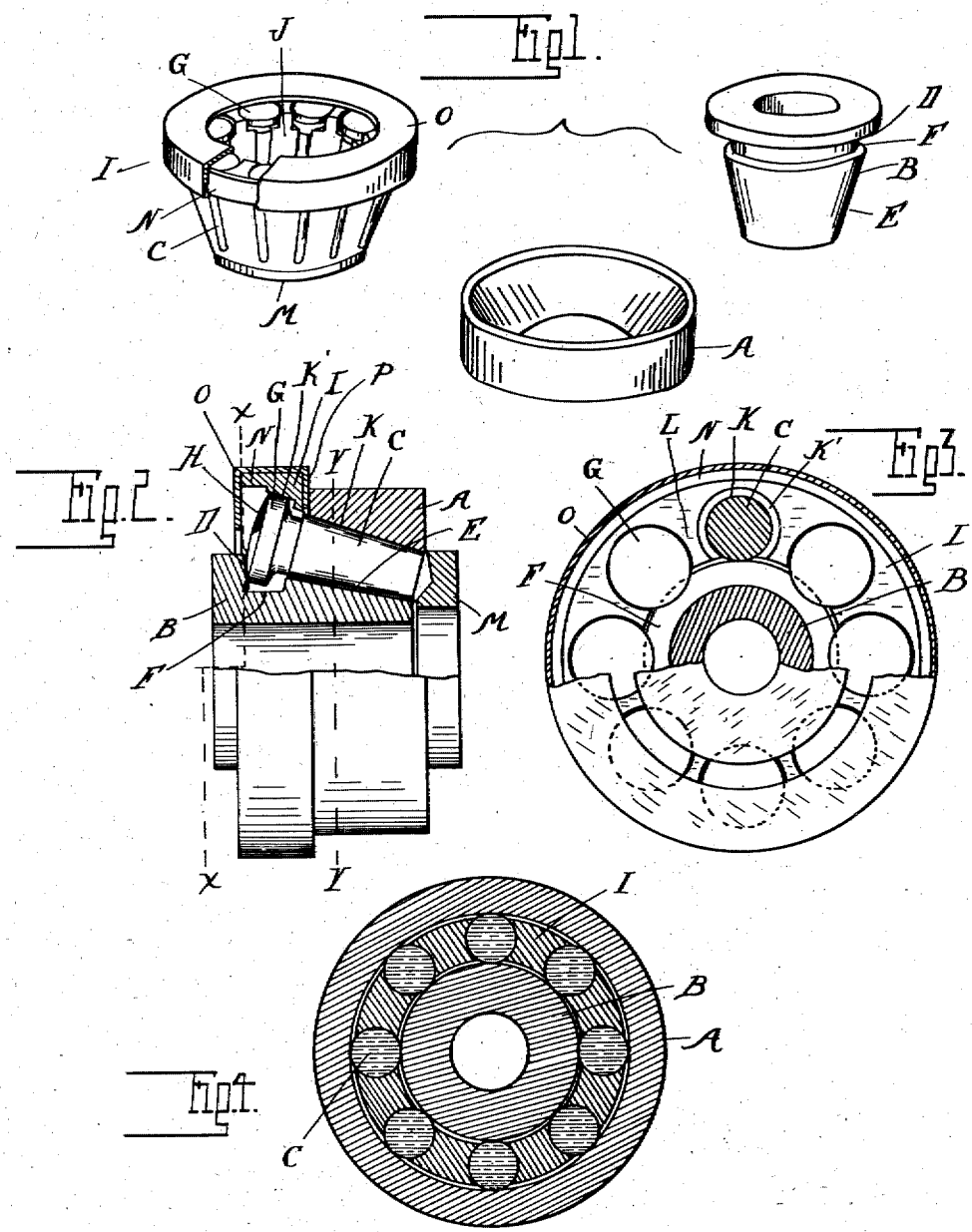

HENRY L. BOCK, OF TOLEDO, OHIO, ASSIGNOR, BY MESNE ASSIGNMENTS, TO THE BOCK COMPANY, A CORPORATION OF OHIO, (INCORPORATED IN OHIO IN MARCH, 1916.)

ROLLER-BEARING.

1,200,457.

Specification of Letters Patent. Patented Oct. 10, 1916.

Application filed June 28, 1913. Serial No. 776,274.

*To all whom it may concern:*

Be it known that I, HENRY L. BOCK, a citizen of the United States of America, residing at Toledo, in the county of Lucas and State of Ohio, have invented certain new and useful Improvements in Roller-Bearings, of which the following is a specification, reference being had therein to the accompanying drawings.

The invention relates to roller bearings of the type adapted to carry both radial and end thrust loads, and has particular reference—first, to the means for retaining the rollers so as to be readily engageable with and disengageable from their coöperating race members; further, in the means for holding said rollers in proper alinement; and further, in various specific features of construction as hereinafter set forth.

In the drawings: Figure 1 is a perspective view of the several parts of the roller bearing detached; Fig. 2 is a central longitudinal section through the assembled bearing; Fig. 3 is a cross section on line *x—x* Fig. 2; and Fig. 4 is a cross section on line *y—y* Fig. 2.

It is the primary object of the invention to obtain a construction of combined radial and end thrust load carrying roller bearing, in which all contacting surfaces have the same ratio of speed. This I obtain by the use of conical rollers having enlarged heads in coöperation with a conical race member having a transversely-extending end thrust surface adapted to bear against the enlarged heads of the rollers in the line of projection of the conical surfaces thereof. The ratio of speed is therefore the same between the end thrust load carrying surfaces, so that friction is reduced to the minimum. It is essential, however, to maintain a proper spacing and alinement of the rollers, for which purpose I have provided a cage or roller holder of novel construction.

As shown, A is the outer race member; B the inner race member, both of which are of conical form but of different tapers, so as to provide a space therebetween for a series of conical rollers C. One of the race members—such as the member B—is provided with a transversely extending end thrust bearing surface D, which crosses the plane of projection of the conical surface E and groove F separating said surfaces. Each of the rollers C is provided with an enlarged head G, which has a spherical end face H for contacting with the face D of the race member B. The surfaces H and D are so fashioned and are at such an angular relation to each other that the line of contact will be in the projection of the conical surfaces of said rollers and race member B, as above stated. The rollers are spaced and held in proper alinement by a cage member I, which is so constructed as to fit between the race members B and A, out of contact therewith, and at the same time to form receiving sockets for the rollers. I preferably form this member I as a die casting, having the central conical recess J for receiving the inner race member B, and a series of conical recesses K for receiving the rollers C. These recesses intersect the outer and inner faces of the cage, so as to form a series of oppositely concaved spacer members L, which at their ends are tied together by continuous rings M and N. The ring M, which is at the small end of the cage, is located beyond the ends of the rollers, while the ring N, at the large end of the cage, is laterally offset or of larger diameter so as to clear the sockets K and permit of the insertion of the rollers therein. The sockets K are also provided with enlarged ends K' for receiving the heads G of the rollers, and the proportion of the parts is such that when the bearing is assembled and the rollers are in contact with the outer and inner race members A and B, they will be provided with a slight clearance space from their respective sockets, which permits freedom for rolling.

To hold the rollers in engagement with the cage, I preferably provide a retainer O, which, as shown, is a sheet metal ring extending over the ends of the cage and rollers, and having a flange P spun inward about the offset in the cage to lock the retainer in position. When thus arranged, the cage with the rollers therein may be engaged or disengaged with the race members A and B, sufficient clearance being provided between the retainer O and the ends of the rollers to allow the latter to move outward, so that the enlarged heads G may pass the large end of the cone E and into engagement with the groove F.

What I claim as my invention is:

1. A roller bearing, comprising concentrically arranged inner and outer race members, a series of rollers therebetween, and an annular cage filling the space between said race members with a slight clearance from the surfaces thereof, said cage having a series of recesses therein, open at one end for the reception of the respective rollers, said recesses intersecting the inner and outer surfaces of the cage to provide clearance for the portions of the rollers contacting with the race members, and imperforate rings at the opposite ends of said cage member for holding the portions between said rollers in fixed relation.

2. A roller bearing, comprising inner and outer concentrically arranged conical race members, one of said members being provided with a transversely arranged end thrust bearing surface, a series of conical rollers interposed between said race members and provided with enlarged ends having spherical surfaces contacting with said transversely arranged end thrust surface in line with the projection of the contacting conical surfaces of said rollers and race member, and a cage for retaining said rollers formed of a die casting fitting with a slight clearance between said inner and outer race members and having a series of conical recesses therein for receiving the respective rollers, said recesses being enlarged at one end to receive the enlarged heads of said rollers and intersecting the inner and outer surfaces of said cage to provide clearance for the portions of said rollers contacting with said race members.

3. A roller bearing, comprising inner and outer concentrically arranged conical race members, a series of conical rollers interposed therebetween and provided with enlarged heads with spherical end thrust bearing surfaces, a transversely extending end thrust surface on one of said race members contacting with said rollers in line with the projection of the contacting conical surfaces of said rollers and race member, a cage for said rollers comprising a die casting completely filling the space between said race members and rollers, with a slight clearance from the surfaces thereof, the recesses for receiving the individual rollers intersecting the inner and outer surfaces on said cage, and a laterally projecting ring at the enlarged end of said cage for uniting the spacing portions between said rollers.

4. A roller bearing, comprising concentrically arranged inner and outer race members, one of which is provided with a transversely extending end thrust surface, a series of conical rollers interposed between said inner and outer race members and provided with enlarged heads contacting with said transversely-extending surface, and a cage member formed of a die casting completely filling the space between said race members and rollers with a slight clearance from the surface thereof, and having integral annular portions at the opposite ends of said rollers and spaced intermediate portions united thereby.

5. A roller bearing, comprising inner and outer race members, a series of rollers therebetween, a cage for said rollers interposed between said race members provided with a series of recesses engageable with their respective rollers at one end thereof, and a ring spun inward about said cage at said end to retain said rollers in position.

6. A roller bearing, comprising spaced inner and outer race members, a series of rollers therebetween, a cage for said rollers interposed between said race members, said cage being provided with a series of recesses engageable with their respective rollers at an end thereof, said recesses intersecting the inner and outer faces of the cage, forming oppositely concaved spacer members, continuous rings tying said members together, and a sheet metal ring extending over the ends of the cage and rollers provided with a flange spun inward about the cage to lock one of said continuous rings in place.

7. A roller bearing, comprising concentrically arranged inner and outer race members, one of which is provided with a transversely extending end thrust surface, a series of rollers interposed between said inner and outer race members and provided with enlarged heads contacting with said transversely-extending surface, a cage for said rollers filling the space between said race members and rollers, with a slight clearance from the surfaces thereof, and a laterally projecting ring surrounding said rollers at their enlarged-headed ends, said ring having enlarged portions for receiving the enlarged heads of the rollers.

8. A roller bearing, comprising concentrically-arranged inner and outer race members, one of which is provided with a transversely-extending end thrust surface, a series of rollers interposed between said inner and outer race members and provided with enlarged heads contacting with said transversely-extending surface, a cage for said rollers interposed between said race members, said cage being provided with a series of recesses engageable with their respective rollers at an end thereof, said recesses intersecting the inner and outer surfaces of the cage, and a ring extending over the ends of the cage and rollers, spun inward about said cage to retain said rollers in position, said ring being spaced from the ends of the enlarged heads of said rollers.

In testimony whereof I affix my signature in presence of two witnesses.

HENRY L. BOCK.

Witnesses:
 JAMES P. BARRY,
 PHYLLIS COBURN.

It is hereby certified that the assignee in Letters Patent No. 1,200,457, granted October 10, 1916, upon the application of Henry L. Bock, of Toledo, Ohio, for an improvement in "Roller-Bearings," was erroneously described and specified as "The Bock Company," whereas said assignee should have been described and specified as *The Bock Bearing Company*, as shown by the records of assignments in this office; and that the said Letters Patent should be read with this correction therein that the same may conform to the record of the case in the Patent Office.

Signed and sealed this 22d day of October, A. D., 1918.

[SEAL.] R. F. WHITEHEAD,
*Acting Commissioner of Patents.*

Cl. 64—62.